United States Patent [19]

Saito et al.

[11] 4,327,287

[45] Apr. 27, 1982

[54] LASER SCANNING APPARATUS

[75] Inventors: Tutomu Saito, Yokohama; Ryoji Yamaguchi, Yutaka, both of Japan

[73] Assignee: Tokyo Shibaura Denki Kabushiki Kaisha, Japan

[21] Appl. No.: 119,636

[22] Filed: Feb. 7, 1980

[30] Foreign Application Priority Data

Feb. 14, 1979 [JP] Japan .................................. 54-14923

[51] Int. Cl.³ ............................................. G02B 27/17
[52] U.S. Cl. ..................................... 250/234; 358/206
[58] Field of Search ................. 250/234, 235; 350/6.5; 358/206

[56] References Cited

U.S. PATENT DOCUMENTS 3,970,359  7/1976  Starkweather .

*Primary Examiner*—David C. Nelms
*Assistant Examiner*—Darwin R. Hostetter
*Attorney, Agent, or Firm*—Finnegan, Henderson, Farabow, Garrett & Dunner

[57] ABSTRACT

A laser scanning apparatus for scanning a stationary document, which comprises a laser beam deflecting means for deflecting a laser beam such that it scans the stationary document in a main scanning direction, a movable optical means provided between the laser beam deflecting means and stationary document and serving to deflect the laser beam such that it scans in an auxiliary scanning direction substantially at right angles to the main scanning direction, and an optical detecting means moved together with the movable optical means and receiving the scattered beam component from said document.

12 Claims, 8 Drawing Figures

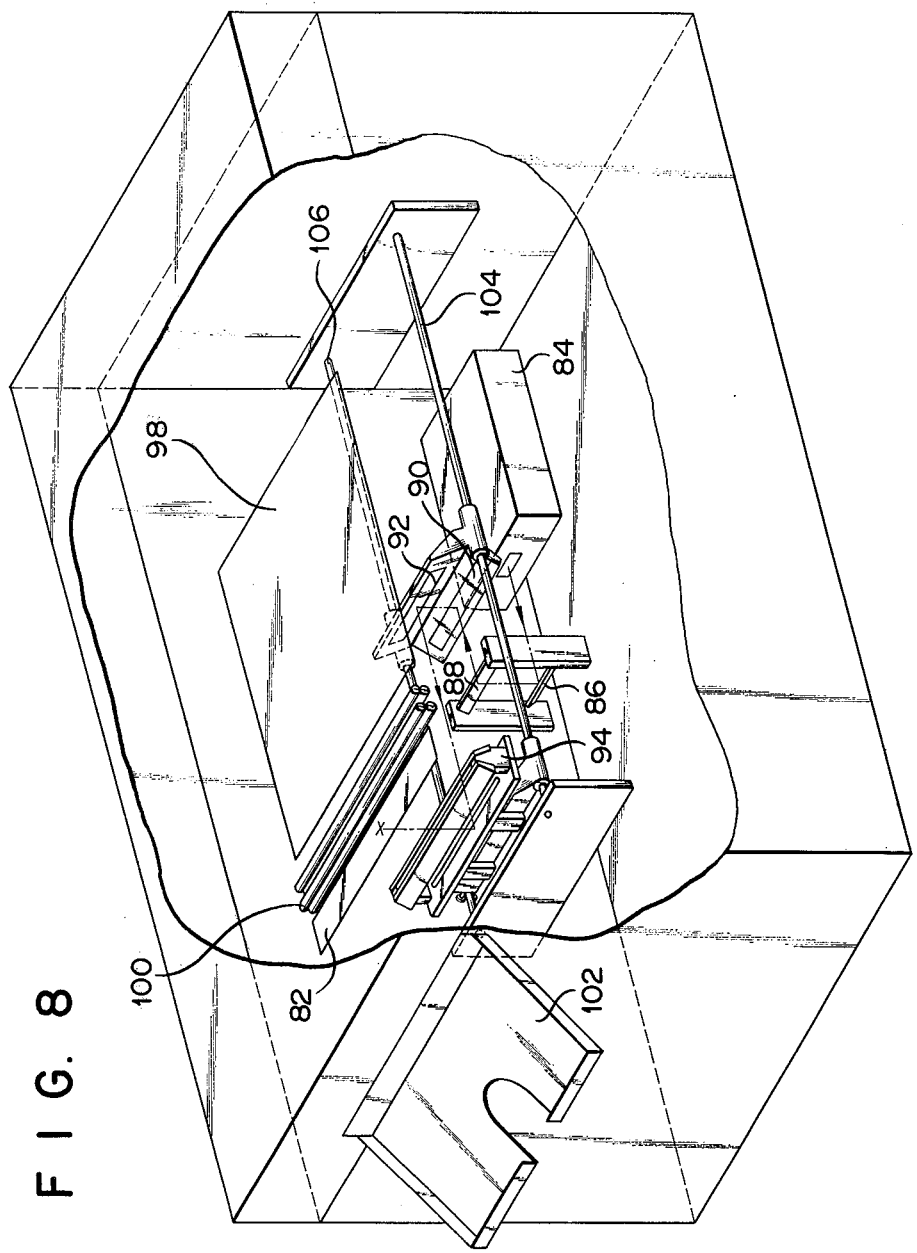

LASER SCANNING APPARATUS

This invention relates to a laser scanning apparatus for reading a document.

The prior-art laser scanning apparatus includes one in which the document is moved as it is being scanned. This type of apparatus involves a document drive mechanism of a complicated construction and is somewhat bulky as a whole due to this mechanism. The drive mechanism is not suitable for a book like document such as a dictionary. In order to solve these problems, stationary document type laser scanning apparatus has been proposed.

In the usual stationary document laser scanning apparatus, a laser beam source, a document drive mechanism and a detecting mechanism for detecting the laser beam reflection from the document are all held stationary, and an optical mechanism for scanning is provided between the laser beam source and detecting mechanism and is moved for scanning the document. This type of laser scanning apparatus does not require any document drive mechanism of a complicated construction and is not so bulky as the moving document type laser scanning apparatus, that is, it can solve the problems inherent to the moving document type scanning apparatus.

In the prior-art laser scanning apparatus of this stationary type, however, the detecting mechanism detects mainly that component of the laser beam which is subjected to regular reflection. Though detection of such regularly reflected component is indeed a merit that the detecting mechanism can be fixedly provided and the light receiving plane for receiving the laser beam as reflected can be made small, there still remains to exist a disadvantage that the characteristics of the detected signals are not satisfactory. Specifically, the intensity level, modulation degree and S/N ratio etc. of such detected signals vary with the scanning position for a document. This results in a failure of a uniform resolution to be obtained. Especially, the signal detected from the peripheral portion of a document is remarkably low in resolution. Therefore, an electrical signal processing circuit of complicated structure is required to minimize the effect of the low-resolution signal upon the resolution of the total signal as detected.

Further, in case when a document of a smaller size than the beam scanning zone is scanned, the influence of stray reflection is pronounced to make high resolution reading difficult or impossible.

This invention seeks to overcome the above drawbacks in the prior-art, and accordingly its object is to provide a laser scanning apparatus of stationary document type, which can be read information out of the entire surface of a document with high resolution.

According to the invention, there is provided a laser scanning apparatus, which comprises a laser beam source, a laser beam deflecting means for deflecting a laser beam produced from the laser beam source such that it scans a stationary document in a main scanning direction, an optical means provided between the laser beam deflecting means and stationary document and serving to deflect the output laser beam from the laser beam source in an auxiliary scanning direction substantially perpendicular to the main scanning direction, said optical means including a movable reflecting system moved in the auxiliary scanning direction while maintaining a constant length of the laser beam path between the laser beam deflecting means and document, and an optical detecting means moved together with the movable reflecting system and receiving the laser beam reflection from the document.

This invention can be more fully understood from the following detailed description when taken in conjunction with the accompanying drawings, in which:

FIG. 8 is a schematic perspective representation of the laser scanning apparatus according to the invention assembled in a duplicating apparatus.

FIG. 1 shows the construction of the laser scanning apparatus according to the invention in combination with a scanning mechanism for recording.

Figure 1:
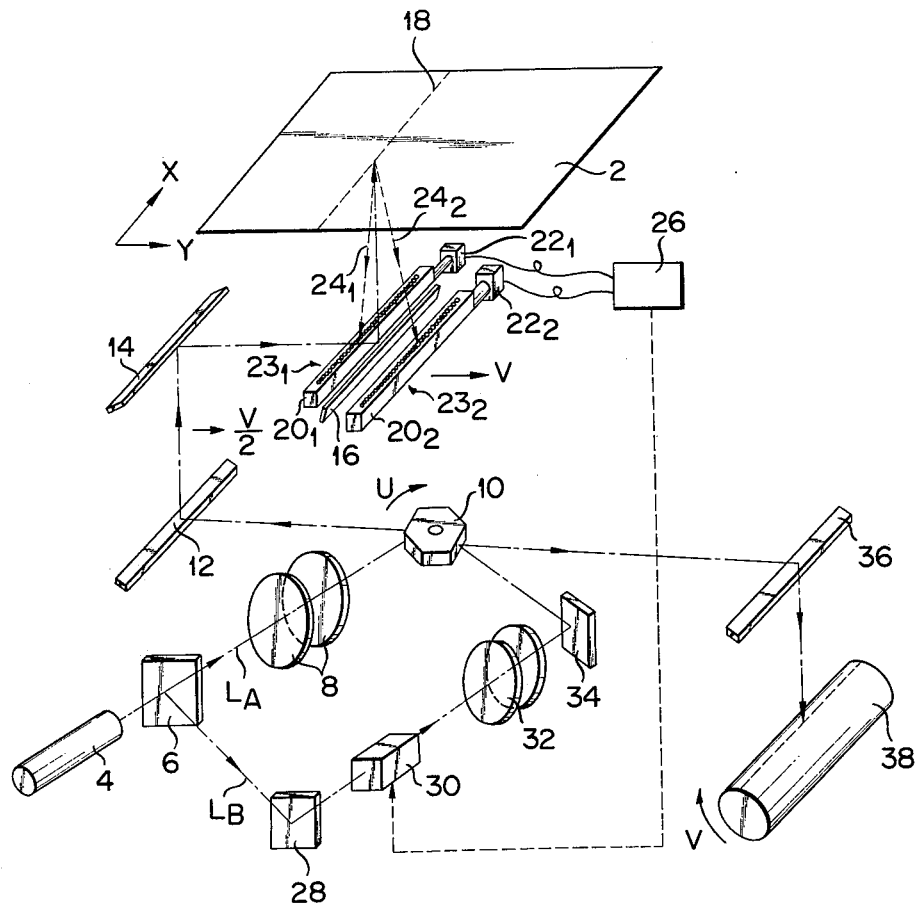
FIG. 1 is a view showing an embodiment of the laser beam scanning apparatus according to the invention in combination with a scanning mechanism for recording.

Referring now to FIG. 1, reference numeral 2 designates a document, with a document underlay means omitted for the sake of simplifying the drawing. Reference numeral 4 designates a laser beam source for producing a laser beam, which is split by a half mirror 6 into two laser beam divisions. One of the laser beam divisions, namely laser beam $L_A$, is used for reading information from the document 2. More particularly, it is transmitted through a lens system 8, deflected by a multi-faceted rotating mirror 10 and reflected by reflecting mirrors 12, 14 and 16 to reach the document surface. The lens system 8 is provided for setting the diameter of the incident beam spot on the document surface to a desired size. The multi-faceted rotating mirror 10 is rotated by a suitable drive circuit (not shown) at a constant speed in the direction of arrow U for deflecting the incident laser beam $L_A$ such that it scans the document 2 in an X direction (main scanning direction). The direction of progress of the beam $L_A$, having been suitably deflected by the multi-faceted rotating mirror 10, is changed by 90 degrees by the reflecting mirror 12 and then further changed by 90 degrees by the reflecting mirror 14 so that the resultant beam proceeds in a direction parallel to and opposite in sense to the direction of progress of the beam incident on the reflecting mirror 12. The direction of progress of the beam $L_A$ from the reflecting mirror 14 is further changed by 90 degrees by the reflecting mirror 16 so that the resultant beam is incident on the scanned surface of the document 2 at right angles thereto. While FIG. 1 shows the course or path of the beam only at a particular instant, the laser beam issuing from the laser beam source 4 is subjected to deflection over a predetermined angle range by the multi-faceted rotating mirror 10 with the rotation thereof so that the beam $L_A$ scans the entire surface of the document 2. The trace of the scanning beam over the surface of the document being seemed is shown by a broken line 18.

For the scanning of the document 2 in a Y direction (auxiliary scanning direction), the reflecting mirrors 12, 14 and 16 are suitably moved by an appropriate drive mechanism (not shown). When the scanning apparatus is in operation, the reflecting mirror 16 is moved in the Y direction at a constant speed V, while the reflecting mirrors 12 and 14 are moved in unison with each other in the same direction but at a speed ½ V. While the drive mechanism for moving the reflecting mirrors 12, 14 and 16 are not shown in FIG. 1, it may, for instance, be a rack-and-pinion type gear mechanism. With the optical system mechanism of the above construction and operation, including the reflecting mirrors 12, 14 and 16 and permitting the scanning of the document 2 in the Y direction, it is possible to maintain a constant length of beam path between the multi-faceted rotating mirror 10 and document 2 independently of the position of the optical system mechanism in the Y direction.

Figure 2:
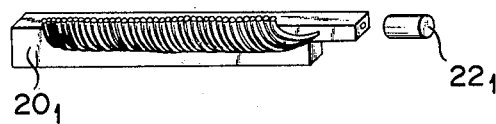
FIG. 2 is a perspective view, partly broken away, showing the construction of an optical fiber bundles.

The amount of scattered beam component from the document 2, obtained as the laser beam $L_A$ is incident on the document varies with the shade information such as characters and drawings written on the document 2. An optical detecting mechanism, which receives the scattered beam component from the document 2, includes an optical detecting unit $23_1$ disposed on one side of the reflecting mirror 16 and having an optical fiber bundle $20_1$ serving as receiving element to receive the scattered beam component from the document 2 and an optical detecting element $22_1$ such as a photo-detector element to receive and photoelectrically convert the received optical information conducted from the optical fiber bundle $20_1$ and another optical detecting unit $23_2$ disposed on the other side of the reflecting mirror 16 and having a similar optical fiber bundle $20_2$ serving as receiving element to receive the scattered beam component from the document 2 and a similar optical detecting element $22_2$ such as a photo-detector element to receive and photoelectrically convert the received optical information conducted from the optical fiber bundle $20_1$. The optical fiber bundles $20_1$ and $20_2$ extend parallel to the length direction of the reflecting mirror 16 and are spaced apart therefrom by an equal distance. Each of the optical fiber bundles $20_1$ and $20_2$ consists of a plurality of optical fibers arranged in a row along the X direction with their one end directed to face the document 2. FIG. 2 outlines the construction of the optical fiber bundle $20_1$. Desirably, the optical fiber bundles $20_1$ and $20_2$ have a length equal to each other in the X direction at least covering the length of the reflecting mirror 16. The other ends of these optical fibers are connected to the associated optical detectors $22_1$ and $22_2$.

Figure 3:
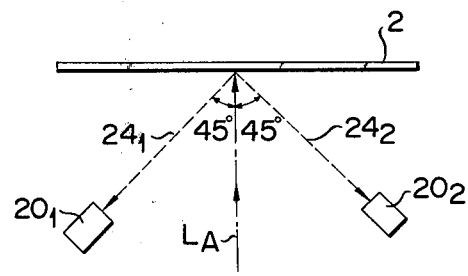
FIG. 3 is a view showing the way in which laser beam reflection from a document is received by optical fiber bundle.

FIG. 3 shows the disposition of the optical fiber bundles $20_1$ and $20_2$. As is shown, the optical fiber bundles $20_1$ and $20_2$ are disposed to face the scanned surface of the document 2 at an angle of 45 degrees with respect to the direction of the incident beam $L_A$, so that the optical fiber bundle $20_1$ receives a scattered beam component $24_1$ reflected on the left side of the incident beam at an angle of 45 degrees relative thereto while the optical fiber bundle $20_2$ receives a scattered beam component $24_2$ reflected on the right side of the incident beam at an angle of 45 degrees relative thereto. In order to maintain this state or reception, the optical fiber bundles $20_1$ and $20_2$ have to be moved in unison with the reflecting mirror 16 in the Y direction at the constant speed V. Accordingly, the drive mechanism (not shown) for moving the reflecting mirror 16 is also adapted to move the optical fiber bundles $20_1$ and $20_2$ in unison with the reflecting mirror 16. The optical detectors $22_1$ and $22_2$ each produces an electric signal corresponding to the intensity of the received beam, and this electric signal is supplied to an electric processing circuit 26 mainly consisting of an amplifier. The description so far has concerned a scanning mechanism for reading information from a document.

Now, a scanning mechanism for recording, which is combined with the above scanning system to provide a duplicator, will now be described.

The other laser beam division, namely laser beam $L_B$, from the half mirror 6 is reflected by a fixed mirror 28 to be incident on an optical modulator 30. The optical modulator 30 also receives an output signal from the signal processing circuit 26, and the incident laser beam $L_B$ is subjected to intensity modulation according to this output signal. The resultant modulation of the laser beam $L_B$ is transmitted through a lens system 32, reflected by a fixed mirror 34 to the multifaceted rotating mirror 10 and deflected thereby. The deflected beam $L_B$ is reflected by a fixed mirror 36 to be incident on a recording drum 38 so that it scans the drum 38. The surface of the drum 38 is adapted to be charged by a suitable mechanism (not shown) according to the intensity of the incident beam $L_B$. The recording drum 38 is rotated at a peripheral speed equal to the speed V of the reflecting mirror 16. Since the scanning mechanism for recording operates in the manner as described above, when the laser beam $L_A$ completes the scanning of the entire scanned surface of the document 2, a charge pattern corresponding to the shade information of the document 2 is formed on the surface of the recording drum 38. On the basis of this charge pattern a copy of the document can be obtained with a well-known copying mechanism.

Figure 4:
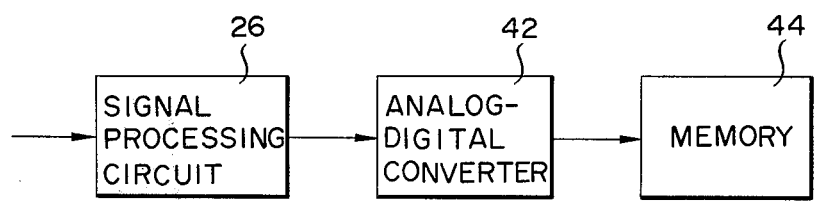
FIG. 4 is a block diagram showing a modification of the embodiment of FIG. 1.

In case where the read-out data is directly coupled to a computer for data processing or the like, the scanning mechanism for recording is unnecessary, and as shown, for instance, in FIG. 4 the output signal from the signal processing circuit 26 may be converted to digital data by an analogue-to-digital converter 42, and the digital information therefrom may be successively written in a memory 44.

It will be appreciated that with the aforedescribed construction of the laser scanning apparatus according to the invention, in which the optical fiber bundles $20_1$ and $20_2$ constituting the optical detecting mechanism each consists of a plurality of optical fibers arranged in a row extending along the X direction of scanning and at least covering the length of the reflecting mirror 16, the scattered beam component 2 can be uniformly received over the entire area of the document 2. Thus, it is possible to permit accurate reading of information over the entire surface of the document inclusive of portions in the neighborhood of the edges thereof and thus increase the resolution. Also, since the optical detecting mechanism is moved together with the reflecting mirror 16, it is possible to minimize the influence of stray reflection even when scanning a document of a smaller size than the beam scanning zone. Further, since a constant length of the beam path from the multifaceted rotating mirror 10 to the document 2 is maintained independently of the movement of the optical system mechanism including the reflecting mirrors 12, 14 and 16, a constant beam spot can be maintained irrespective of the changes of the scanning beam spot in the Y direction, so that it is possible to obtain a still higher resolution of reading.

The preceding embodiment of the invention is by no means limitative, and various changes and modifications can be conceived.

Figure 5:
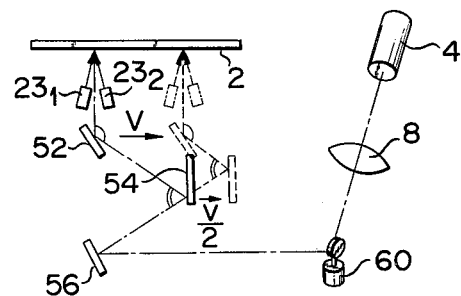
FIG. 5 is a view showing a different example of the optical system mechanism which may be assembled in the laser scanning apparatus shown in FIG. 1.

For example, the optical system mechanism for maintaining a constant beam path between the multi-faceted rotating mirror 10 and document 2 may have a construction as shown in FIG. 5, including two movable reflecting mirrors 52 and 54 and a stationary mirror 56. The beam having been deflected by the galvanometer 60 and incident on the fixed mirror 56 is reflected thereby a predetermined angle, and the reflected beam is further reflected a predetermined angle by the movable reflecting mirror 54 and is then reflected still further by the movable reflecting mirror 52 so that the resultant beam therefrom is incident on the document 2 at right angles thereto. The movable reflecting mirror 52 is moved at a constant speed V, and the movable reflecting mirror 54 is moved at a speed of ½ V. With this construction and operation, a constant length of the beam path between the multi-faceted rotating mirror 10 and document 2 can be maintained.

Figure 6:
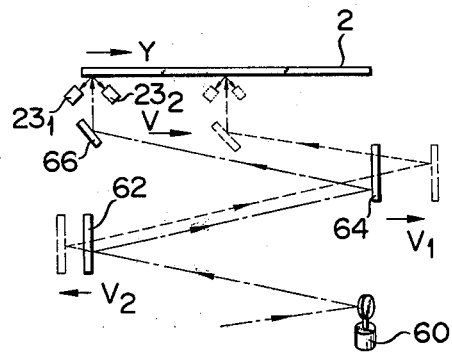
FIGS. 6 and 7 are views showing further examples of the optical system mechanism.

FIG. 6 shows a further example of the optical system mechanism. This optical system mechanism includes three movable reflecting mirrors 62, 64 and 66, and the beam having been reflected by the galvanometer 60 is successively reflected predetermined angles by the respective movable reflecting mirrors 62, 64 and 66 so that the resultant beam is incident on the document 2 at right angles thereto. With this construction, a constant length of the beam path from the galvanometer 60 to the document 2 can be maintained by setting the speed V of movement of the reflecting mirror 66 and optical detecting units $23_1$ and $23_2$ in the Y direction and the speeds $V_1$ and $V_2$ of movement of the respective reflecting mirrors 62 and 64 such as to satisfy a condition $V = |V_1| + |V_2|$. The reflecting mirrors 64 and 66 are moved in the main scanning direction, while the reflecting mirrors 62 is moved in the opposite direction.

Figure 7:
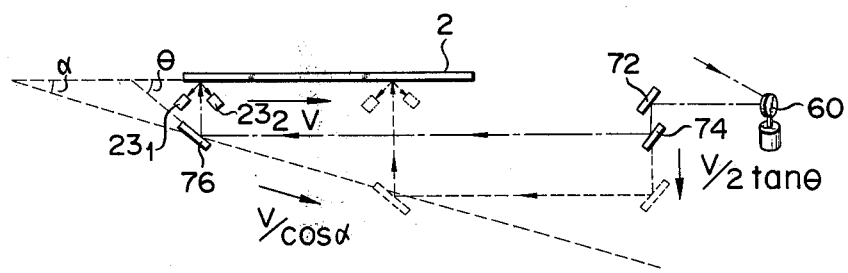

In the preceding examples of the optical system mechanism, the movable reflecting mirrors 16, 52 or 66 and the optical detecting mechanism are moved in unison with each other in the Y direction. FIG. 7 shows a further example of the optical mechanism, which includes a fixed mirror 72 and two movable reflecting mirrors 74 and 76, and in which the optical detecting units $23_1$ and $23_2$ alone are moved in the Y direction at a predetermined speed V. The movable reflecting mirror 76 is moved along a straight line at an angle α with respect to the scanned surface of the document 2 at a speed of V/cos α, and the movable reflecting mirror 74 is moved in a direction normal to the surface of the document 2 at a speed of V/2 tan θ (θ being an angle between the reflecting surface of the reflecting mirror 76 and the surface of the document 2). With this construction and operation mode it is also possible to maintain a constant length of the beam path between the galvanometer 60 and the surface of the document 2. With this mechanism, the laser beam from the galvanometer 60 is successively reflected by the fixed mirror 72 and movable reflecting mirror 74 and 76 in the mentioned order to be incident on the surface of the document 2 at right angles thereto.

FIG. 8 is a schematic perspective view of an apparatus for reading a document which incorporates the laser scanning apparatus according to the invention. Reference numeral 82 designates a scanned window made of transparent glass, 84 a laser scanning system, 86 and 88 fixed mirrors, 90, 92 movable reflecting mirrors and 94 detector. Reference numeral 98 designates a document, 100 transfer rolls for transferring the document 98, 102 a stacker for receiving the document 98, and 104, 106 guide members.

With the apparatus, the document 98 may be scanned in the stationary document mode or in moving document mode according to the user's choice. When the document 98 is scanned in the stationary document mode, the movable reflecting mirrors 90, 92 and detector 94 are moved along the guide members 104, 106 so that the stationary document can be scanned in the same manner as that described in respect of the scanning system of FIG. 1. When, on the other hand, the document 98 is scanned in the moving document mode, the document is moved by the rolls 100 through the scanning window 82, with the movable reflecting mirrors 90, 92 and detector 94 fixed. The document 98 is scanned at the window 82 by the laser beam from the laser scanning system 84. Thereafter, the document 98 is transferred to the stacker 102.

With the apparatus of FIG. 8, a stationary document scanning mode or a moving document scanning mode can be carried out according to the user's choice. Accordingly, the invention can also provide a document reading apparatus which has high operability and wide applicability to the user. For example, a plurality of paper sheet document may be successively scanned, by being transferred to the scanning window 82 one after another, under the moving document mode. Further, a book like document such as a dictionary can also be scanned under the stationary document mode.

While the previous various embodiments have used the optical fiber bundles $20_1$ and $20_2$, it is also possible to use other optical detecting means such as line sensors, that is, any optical detecting means having an elongate receiving surface of a length covering at least the length of, for instance, the movable reflecting mirror 16 in the embodiment of FIG. 1 may be employed in lieu of the optical fiber bundles $20_1$ and $20_2$.

Further, while in the previous embodiments the two optical detecting units are provided on the opposite sides of the movable reflecting mirror, similar effects may also be obtained by disposing a single optical detecting unit on either side of the reflecting mirror.

The effects according to the invention obtainable with the embodiment of FIG. 1 may also be obtained with any other embodiment described in the foregoing. The effects that are obtainable according to the invention are that the scattered beam component from the document 2 can be uniformly received, thus permitting improvement of the resolution of reading of the document 2, and that since the optical detecting mechanism is moved in unison with movable reflecting mirrors the influence of stray reflection can be minimized even with a document of a smaller size than the beam scanning region.

What we claim is:

1. A laser scanning apparatus comprising:
    a laser beam source;
    a laser beam deflecting means for deflecting a laser beam produced from said laser beam source such that said laser beam scans a stationary document in a main scanning direction thereof;
    an optical means provided between said laser beam deflecting means and said stationary document and serving to deflect said laser beam from said laser beam source such that said laser beam scans in an auxiliary scanning direction substantially perpendicular to said main scanning direction, said optical means including a movable reflector system moved in said auxiliary scanning direction while maintaining a constant length of the beam path between said laser beam deflecting means and said document; and an optical detecting means moved together with said movable reflector system and receiving scattered beam component from said document.

2. A laser scanning apparatus according to claim 1, wherein said optical detecting means includes a receiving element having an elongate receiving surface.

3. A laser scanning beam according to claim 2, wherein said receiving element is disposed to receive the scattered beam component from said document at an angle of 45 degrees with respect to the incident laser beam incident on said document.

4. A laser scanning apparatus according to claim 2, wherein said movable reflector system includes a first movable reflector for reflecting said laser beam such that the reflected beam is incident on the surface of said document at right angles thereto, said receiving element being disposed on each side of said first reflector.

5. A laser scanning apparatus according to claim 4, wherein said receiving elements are disposed substantially parallel to the length direction of said first movable reflector and spaced apart therefrom substantially an equal distance.

6. A laser scanning apparatus according to claim 2, wherein the length of said elongate receiving surface of said receiving element is at least greater than the length of said first movable reflector.

7. A laser scanning apparatus according to claim 2, wherein said receiving element includes a plurality of optical fibers arranged in a row extending in the main scanning direction of said document such that their one end faces the surface of said document.

8. A laser scanning apparatus according to claim 2, wherein said receiving element is a line sensor.

9. A laser scanning apparatus according to claim 1, wherein said optical means includes a first movable reflector for reflecting the laser beam from said laser beam deflecting means for a deflection angle of 90 degrees, a second movable reflector for reflecting the incident laser beam such that the reflected laser beam proceeds in a direction substantially parallel to and opposite to the course of the incident beam on said first reflector, and a third movable reflector for reflecting the laser beam from said second movable reflector such that the reflected beam is incident on the surface of said document at right angles thereto, said first and second reflectors being moved at one half the speed of said third reflector.

10. A laser scanning apparatus according to claim 1, wherein said optical means includes a stationary reflector for reflecting the laser beam from said laser beam deflecting means for a predetermined deflection angle, a first movable reflector for reflecting the laser beam from said stationary reflector for a predetermined deflection angle, and a second movable reflector for reflecting the laser beam from said first movable reflector such that the reflected laser beam is incident on the surface of said document at right angles thereto, said first reflector being moved at one half the speed of said second reflector.

11. A laser scanning apparatus according to claim 1, wherein said optical means includes a first movable reflector for reflecting the laser beam from said laser beam deflecting means for a predetermined deflection angle, a second movable reflector for reflecting the laser beam from said first reflector for a predetermined deflection angle, and a third movable reflector for reflecting the laser beam from said second movable reflector such that the reflected laser beam is incident on said document at right angles thereto, said second and third movable reflectors being moved in said auxiliary scanning direction, said first movable reflector being moved in a direction opposite in sense to the direction of progress of said second and third movable reflectors, the speeds V, $V_1$ and $V_2$ of said respective third, second and first movable reflectors being set to satisfy a relation $V = |V_1| + |V_2|$.

12. A laser scanning apparatus according to claim 1, wherein said optical means includes a stationary reflector for reflecting the laser beam from said laser beam deflecting means for a deflection angle of 90 degrees, a first movable reflector reflecting the laser beam from said stationary reflector such that the reflected laser beam is incident on proceeds in a direction parallel to and of the same sense as the direction of progress of the laser beam incident on said stationary reflector, and a second movable reflector for reflecting the laser beam from said first movable reflector such that the reflected laser beam is incident on the surface of said document at right angles thereto, said optical detecting means being moved in said auxiliary scanning direction at a speed V, said first movable reflector being moved in a direction perpendicular to the surface of said document at a speed of $V/2 \tan \theta$ where $\theta$ is the angle between the reflecting surface of said second movable reflector and the surface of said document, said second movable reflector being moved along a straight line at an angle $\alpha$ with said surface of said document at a speed of $V/\cos \alpha$.

* * * * *